(12) United States Patent
Deaton et al.

(10) Patent No.: US 10,380,312 B1
(45) Date of Patent: Aug. 13, 2019

(54) SYSTEM, METHOD, AND COMPUTER PROGRAM PRODUCT FOR ANALYZING FORMAL CONSTRAINT CONFLICTS

(71) Applicant: Cadence Design Systems, Inc., San Jose, CA (US)

(72) Inventors: Craig Franklin Deaton, Rowlett, TX (US); Lars Lundgren, Mölnlycke (SE)

(73) Assignee: Cadence Design Systems, Inc., San Jose, CA (US)

( * ) Notice: Subject to any disclaimer, the term of this patent is extended or adjusted under 35 U.S.C. 154(b) by 254 days.

(21) Appl. No.: 15/371,449

(22) Filed: Dec. 7, 2016

(51) Int. Cl.
*G06F 17/50* (2006.01)
(52) U.S. Cl.
CPC ........ *G06F 17/5081* (2013.01); *G06F 17/504* (2013.01); *G06F 2217/06* (2013.01)
(58) Field of Classification Search
CPC .................................................... G06F 17/504
See application file for complete search history.

*Primary Examiner* — Vuthe Siek
*Assistant Examiner* — Aric Lin
(74) *Attorney, Agent, or Firm* — Mark H. Whittenberger, Esq.; Holland & Knight LLP (57) ABSTRACT

The present disclosure relates to a method for electronic design verification. Embodiments may include receiving, using at least one processor, an electronic design and identifying one or more assumptions associated with the electronic design that are mutually in conflict. Embodiments may further include grouping the one or more assumptions that are mutually in conflict into a conflicting group of assumptions and iteratively disabling at least one of the conflicting group of assumptions. Embodiments may include generating at least one trace pair depicting a scenario where an assumption from a disabled set holds in a first trace but is violated in a second trace. Embodiments may further include identifying at least one signal associated with the first trace and at least one signal associated with the second trace and comparing the at least one signal associated with the first trace and the at least one signal associated with the second trace.

20 Claims, 10 Drawing Sheets

SYSTEM, METHOD, AND COMPUTER PROGRAM PRODUCT FOR ANALYZING FORMAL CONSTRAINT CONFLICTS

FIELD OF THE INVENTION

The present disclosure relates to electronic design verification, and more specifically, to a method for analysis of formal constraint conflicts.

DISCUSSION OF THE RELATED ART

Formal verification relies upon a system of constraints to communicate the legal state space to the proof engines. The situation often arises that there is one or more contradictions in the constraints that causes there to be no legal state space. The complexity of the system of constraints, in combination with the design and glue logic, makes it difficult, if not impossible, to precisely locate the root cause of the conflict.

There are currently solutions in the industry that identify the set of conflicting assumptions, but none that provide a detailed analysis of the conflict. The current best known methods for analyzing conflicting constraints are manual and very labor intensive. One common approach is to "just think it through", with no help from any computer program or tools. Another approach is to remove one of the conflicting constraints, so that a trace may be generated satisfying the remaining constraints, and then try to deduce (without any guidance) how applying the remaining constraint would conflict with this trace.

SUMMARY OF DISCLOSURE

In one or more embodiments of the present disclosure, a computer-implemented method for electronic design verification. The method may include receiving, using at least one processor, an electronic design and identifying one or more assumptions associated with the electronic design that are mutually in conflict. The method may further include grouping the one or more assumptions that are mutually in conflict into a conflicting group of assumptions and iteratively disabling at least one of the conflicting group of assumptions. The method may include generating at least one trace pair depicting a scenario where an assumption from a disabled set holds in a first trace but is violated in a second trace. The method may further include identifying at least one signal associated with the first trace and at least one signal associated with the second trace and comparing the at least one signal associated with the first trace and the at least one signal associated with the second trace.

One or more of the following features may be included. In some embodiments, comparing may include identifying a difference in value between the first trace and the second trace. The method may further include providing the difference in value between the first trace and the second trace to a user's computing device. In some embodiments, providing may include providing at least one signal pair or at least one cycle pair. The method may include displaying the at least one signal pair or at least one cycle pair within a trace viewer. The method may further include displaying logic associated with the at least one signal pair or at least one cycle pair in a schematic viewer. The method may further include receiving an indication from a user regarding a section of a current path that is not of interest and obtaining a new conflict associated with a new path.

In one or more embodiments of the present disclosure a computer-readable storage medium having stored thereon instructions, which when executed by a processor result in one or more operations is provided. Operations may include receiving, using at least one processor, an electronic design and identifying one or more assumptions associated with the electronic design that are mutually in conflict. Operations may further include grouping the one or more assumptions that are mutually in conflict into a conflicting group of assumptions and iteratively disabling at least one of the conflicting group of assumptions. Operations may include generating at least one trace pair depicting a scenario where an assumption from a disabled set holds in a first trace but is violated in a second trace. Operations may further include identifying at least one signal associated with the first trace and at least one signal associated with the second trace and comparing the at least one signal associated with the first trace and the at least one signal associated with the second trace.

One or more of the following features may be included. In some embodiments, comparing may include identifying a difference in value between the first trace and the second trace. Operations may further include providing the difference in value between the first trace and the second trace to a user's computing device. In some embodiments, providing may include providing at least one signal pair or at least one cycle pair. The method may include displaying the at least one signal pair or at least one cycle pair within a trace viewer. Operations may further include displaying logic associated with the at least one signal pair or at least one cycle pair in a schematic viewer. Operations may further include receiving an indication from a user regarding a section of a current path that is not of interest and obtaining a new conflict associated with a new path.

In one or more embodiments of the present disclosure, a system for electronic design verification is provided. The system may include one or more processors configured to receive an electronic design and identify one or more assumptions associated with the electronic design that are mutually in conflict. The at least one processor may be further configured to group the one or more assumptions that are mutually in conflict into a conflicting group of assumptions and iteratively disable at least one of the conflicting group of assumptions. The at least one processor may be further configured to generate at least one trace pair depicting a scenario where an assumption from a disabled set holds in a first trace but is violated in a second trace. The at least one processor may be further configured to identify at least one signal associated with the first trace and at least one signal associated with the second trace and compare the at least one signal associated with the first trace and the at least one signal associated with the second trace.

One or more of the following features may be included. In some embodiments, comparing may include identifying a difference in value between the first trace and the second trace. The at least one processor may be further configured to provide the difference in value between the first trace and the second trace to a user's computing device. In some embodiments, providing may include providing at least one signal pair or at least one cycle pair. The at least one processor may be further configured to display the at least one signal pair or at least one cycle pair within a trace viewer. The at least one processor may be further configured to display logic associated with the at least one signal pair or at least one cycle pair in a schematic viewer. The at least one processor may be further configured to receive an indication from a user regarding a section of a current path that is not of interest and obtaining a new conflict associated with a new path.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Figure 1:
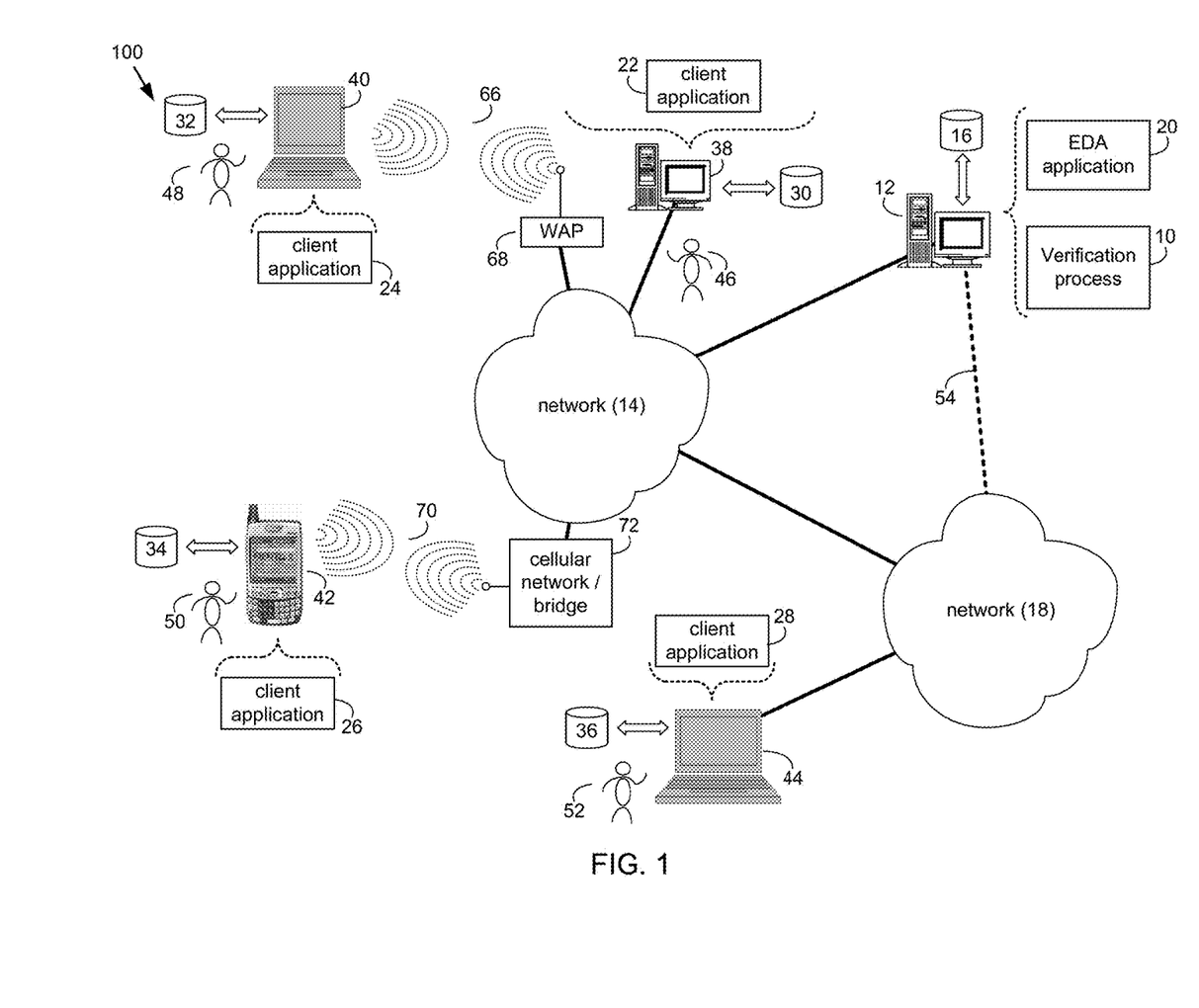
FIG. 1 is a diagram depicting an embodiment of a system in accordance with the present disclosure.

Referring to FIG. 1, there is shown a verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, verification process 10 may reside on and be executed, in whole or in part, by a client electronic device, such as a personal computer, notebook computer, personal digital assistant, or the like.

The instruction sets and subroutines of verification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Verification process 10 may be a stand alone application, or may be an applet/application/script that may interact with and/or be executed within EDA application 20. In addition/as an alternative to being a server-side process, verification process 10 may be a client-side process (not shown) that may reside on a client electronic device (described below) and may interact with an EDA client application (e.g., one or more of EDA client applications 22, 24, 26, 28). Further, verification process 10 may be a hybrid server-side/client-side process that may interact with EDA application 20 and an EDA client application (e.g., one or more of client applications 22, 24, 26, 28). As such, verification process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize verification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
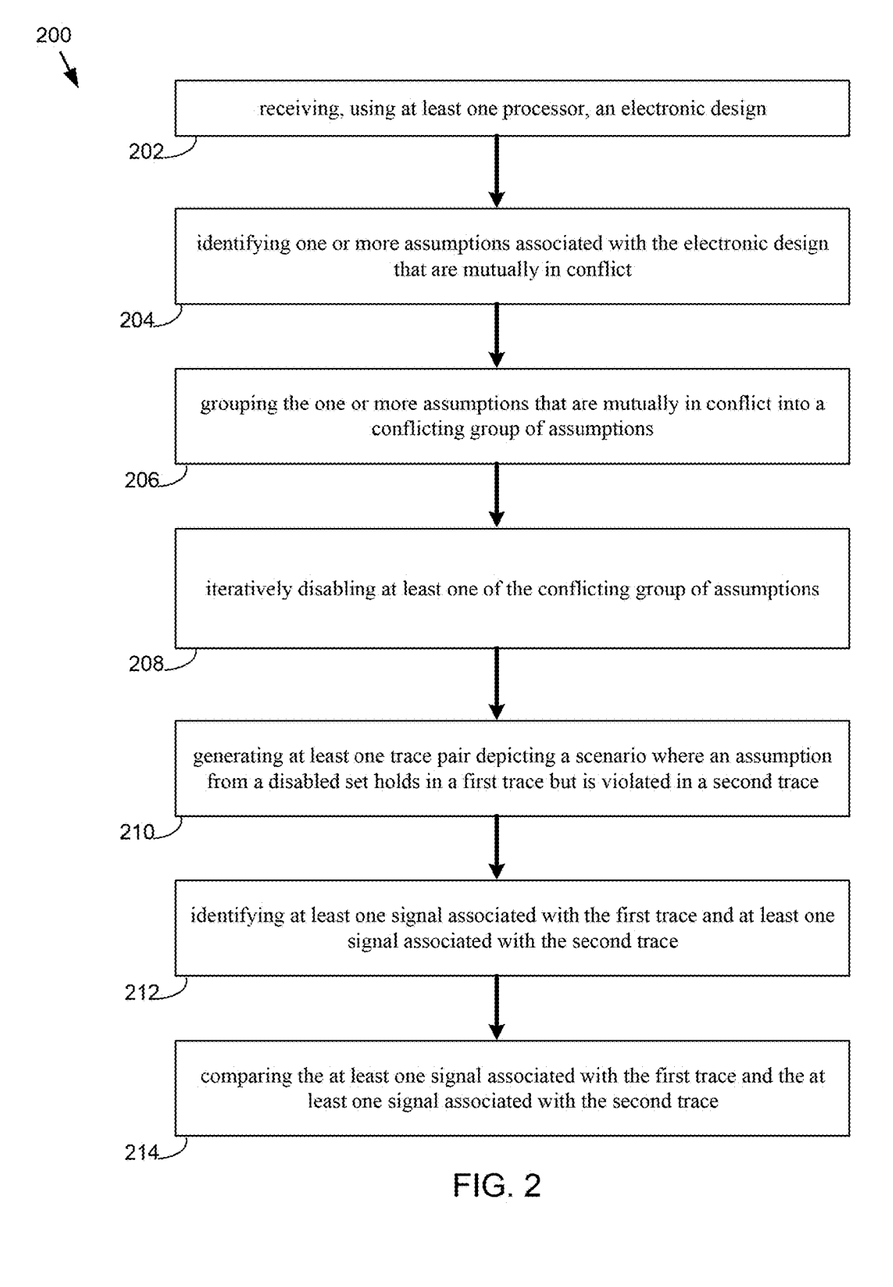
FIG. 2 is a flowchart depicting operations consistent with the verification process in accordance with an embodiment of the present disclosure.

Referring now to FIG. 2, an exemplary flowchart 200 depicting operations consistent with verification process 10 is provided. Operations may include receiving (202), using at least one processor, an electronic design and identifying (204) one or more assumptions associated with the electronic design that are mutually in conflict. The method may further include grouping (206) the one or more assumptions that are mutually in conflict into a conflicting group of assumptions and iteratively disabling (208) at least one of the conflicting group of assumptions. The method may include generating (210) at least one trace pair depicting a scenario where an assumption from a disabled set holds in a first trace but is violated in a second trace. The method may further include identifying (212) at least one signal associated with the first trace and at least one signal associated with the second trace and comparing (214) the at least one signal associated with the first trace and the at least one signal associated with the second trace.

As discussed above, formal verification relies upon a system of constraints to communicate the legal state space to the proof engines. The situation often arises that there is one or more contradictions in the constraints that causes there to be no legal state space. The complexity of the system of constraints, in combination with the design and glue logic, makes it difficult, if not impossible, to precisely locate the root cause of the conflict.

There are currently solutions in the industry that identify the set of conflicting assumptions, but none that provide a detailed analysis of the conflict. The current best known methods for analyzing conflicting constraints are manual and very labor intensive. One common approach is for the designer to attempt to solve the problem with no help from any computer program or tools. Another approach is to remove one of the conflicting constraints, so that a trace may be generated satisfying the remaining constraints, and then try to deduce (without any guidance) how applying the remaining constraint would conflict with this trace.

In these existing approaches, the system of constraints is composed of assumptions, in conjunction with glue logic, design logic, and the reset state of the design and glue logic. The signals referenced by any two assumptions may be directly connected, or may be separated by an arbitrary quantity of boolean and/or sequential logic. The signals referenced by any assumption may be directly connected to the signals for which reset is defined, or may be separated from those signals by an arbitrary quantity of boolean and/or sequential logic. Given that the legal state space is detailed and complex, writing the assumptions and glue logic that represent it is an involved and non-obvious process. It may be easy to write a set of constraints, each of which appear sensible and correct, however, they may be mutually conflicting when applied as a set.

Figure 3:
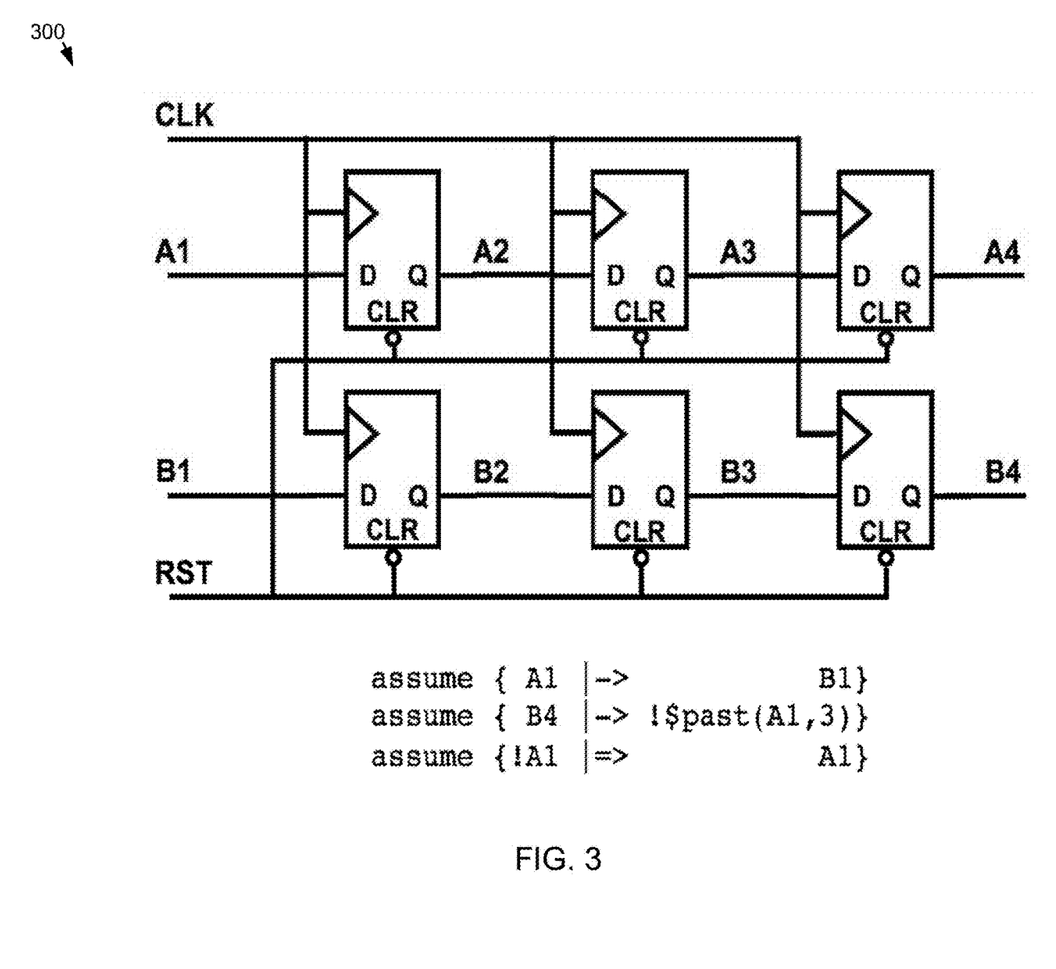
FIG. 3 is a diagram depicting an embodiment in accordance with the present disclosure.

Referring now to FIGS. 3-6, embodiments depicting constraint conflicts are provided. For example, in the particular diagram of FIG. 3:

"assume a1|→b1" means "whenever a1 is '1', then b1 is required to also be '1'"

"assume b4|→!$past(a1,3)"

means "whenever b4 is '1', then a1 is required to have been '0' three clock cycles in the past"

"assume !a1|=>a1" means "whenever a1 is '0', then a1 is required to be '1' on the next clock cycle"

the design simply:

propagates the value of a1 forward, one clock cycle at a time, to a2, then to a3, and finally to a4 propagates the value of b1 forward, one clock cycle at a time, to b2, then to b3, and finally to b4 the conflict arises because:

a1 has to eventually be '1' (it either starts as '1', or starts as '0' and is required to be '1' on the next cycle)

when a1 is b1 is required to also be '1' the design propagates b1 to b4 over the next three clock cycles when b4 is '1' in this scenario, a1 is required to be '0' three clock cycles in the past, but that's impossible (since a1 being '1' three clock cycles in the past is how b4 got to be '1' in the first place)

Figure 4:
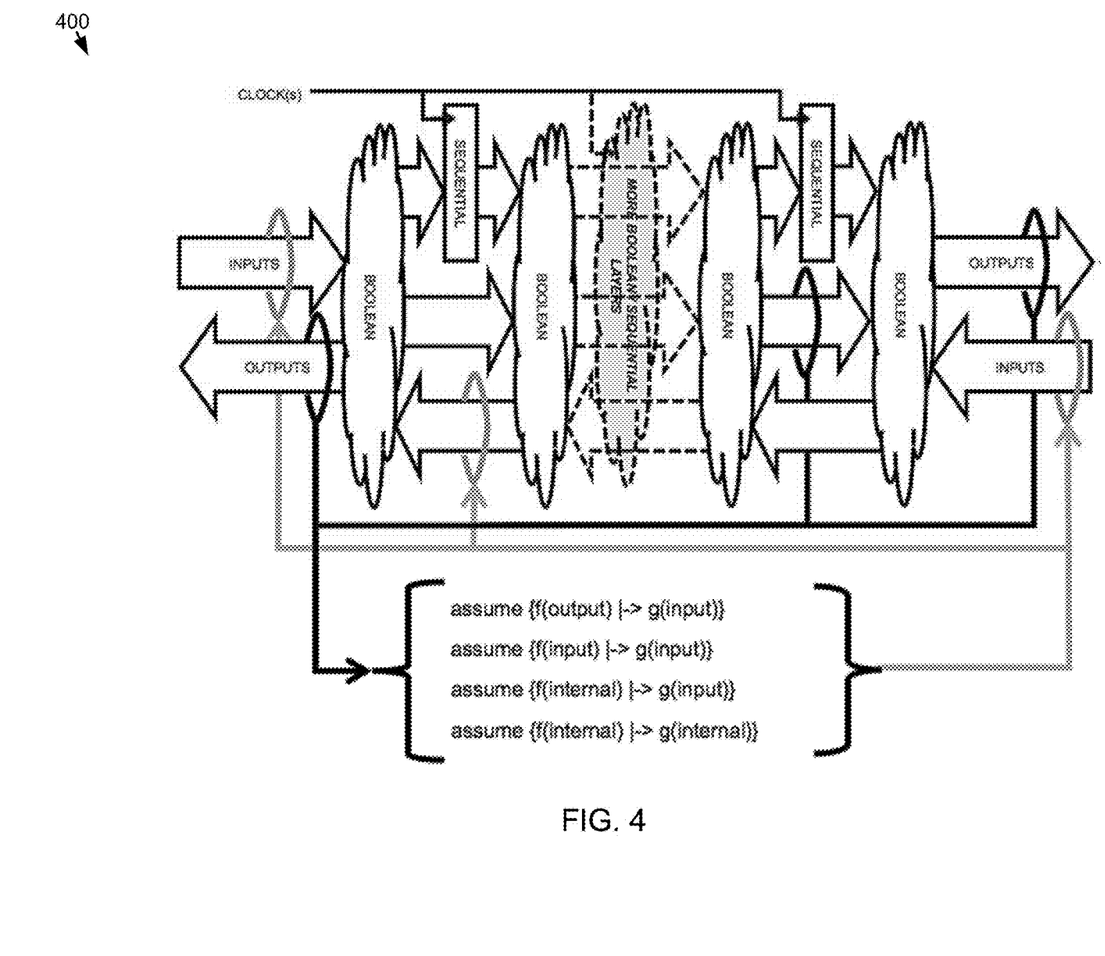
FIG. 4 is a diagram depicting an embodiment in accordance with the present disclosure.

Referring now to FIG. 4, a higher-level illustration of the problem of FIG. 3 is provided. The intent is to show that constraints (assumptions) can refer to any signal (input, output, internal). Moreover, constraints can require any relationship between the signals they reference. This may be shown as generic functions, "f(input, output)", rather than as concrete implications, "output|→input". In some cases the design logic connecting the signals can be arbitrarily complex, including any number of layers of combinational and/or sequential logic, with or without feedback between the layers. A person or ordinary art in this field may recognize that 'arbitrarily complex', in this context, also means 'arbitrarily sequentially deep'.

Figure 5:
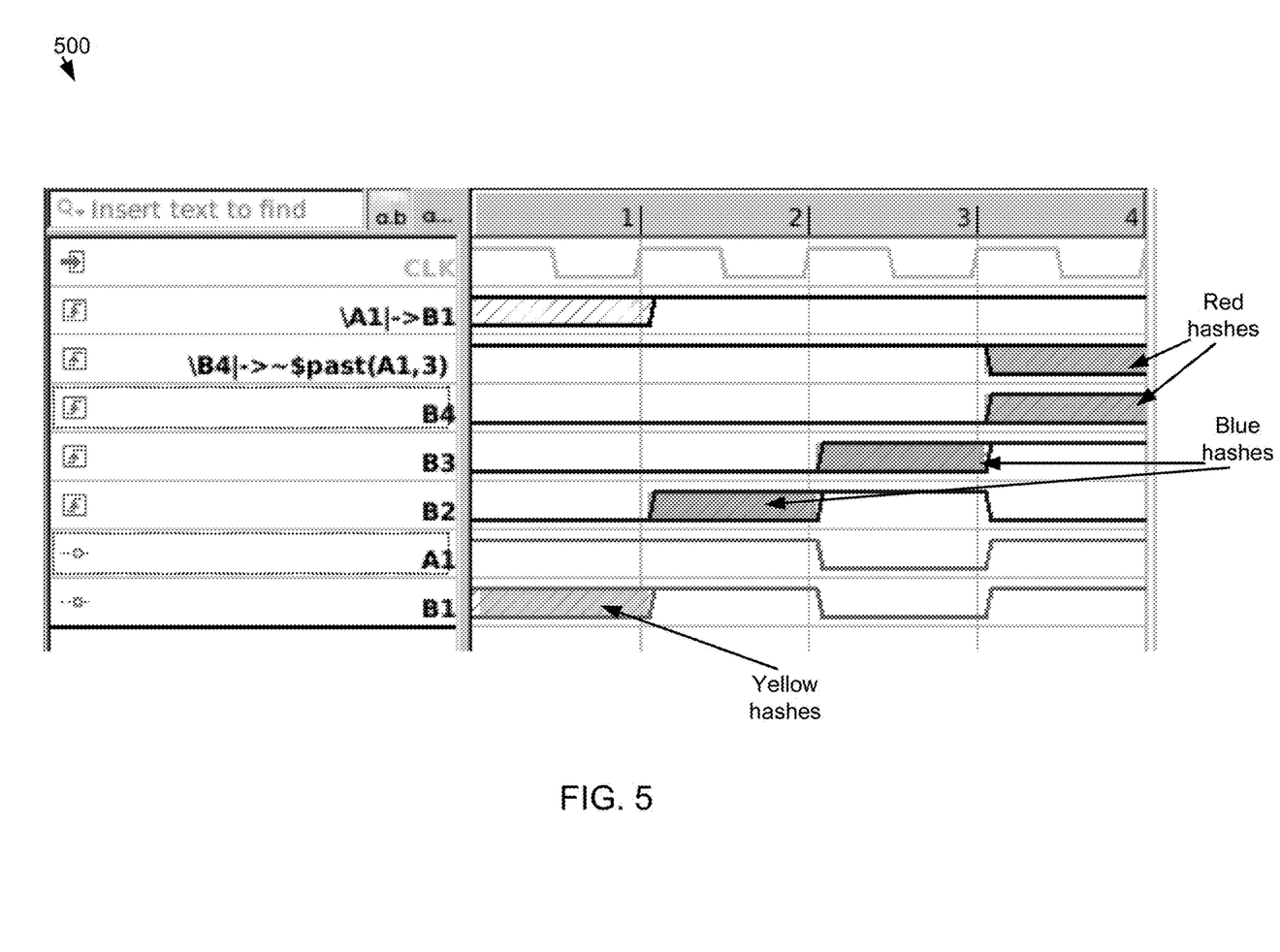
FIG. 5 is a diagram depicting an embodiment in accordance with the present disclosure.

Referring now to FIG. 5, a waveform showing the conflict propagation of FIG. 3 is provided. In this example, the "b4|→!$past(a1)" constraint may be disabled, and generate a trace pair where it is honored/violated on cycle 4 (the red hashes). It is noted that, for the target constraint ("b4|→!$past(a1)") to be in conflict (e.g., honored/violated) on cycle 4, signal b4 must also be in conflict on cycle 4. For a signal, being "in conflict" means having different values in the two traces. Moreover, for b4 to be "in conflict" on cycle 4": b3 must be "in conflict" on cycle 3, b2 must be "in conflict" on cycle 2, and b1-and-a1 must be "in conflict" on cycle 1. It may also be noted that "a1|→b1" being "in conflict" on cycle 1, which highlights that this is where the two constraints collide.

Figure 6:
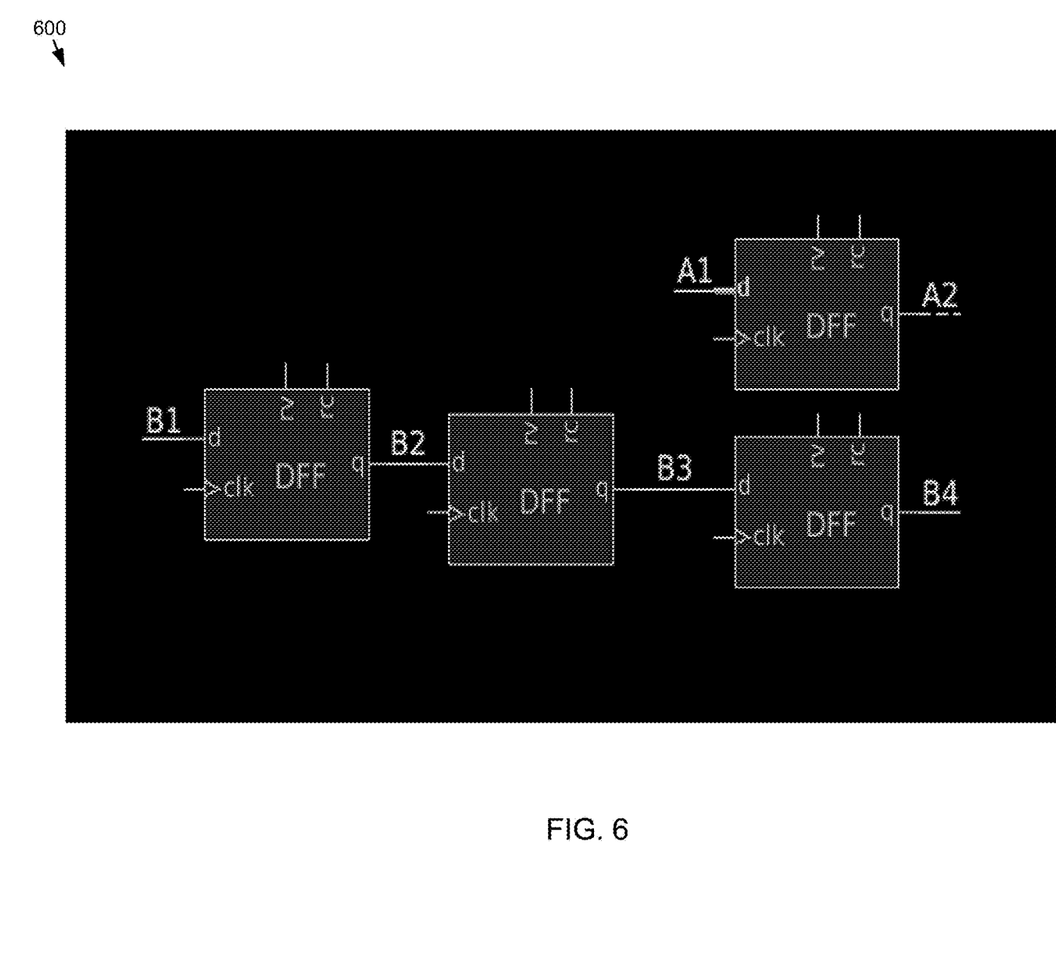
FIG. 6 is a diagram depicting an embodiment in accordance with the present disclosure.

Referring now to FIG. 6, a schematic representation of the conflict propagation shown in the trace in FIG. 5 is provided. In some embodiments there may be a requirement that at most one disabled constraint be violated on any cycle in any trace. This may force the trace pairs to home in on where constraints are in conflict.

Figure 7:
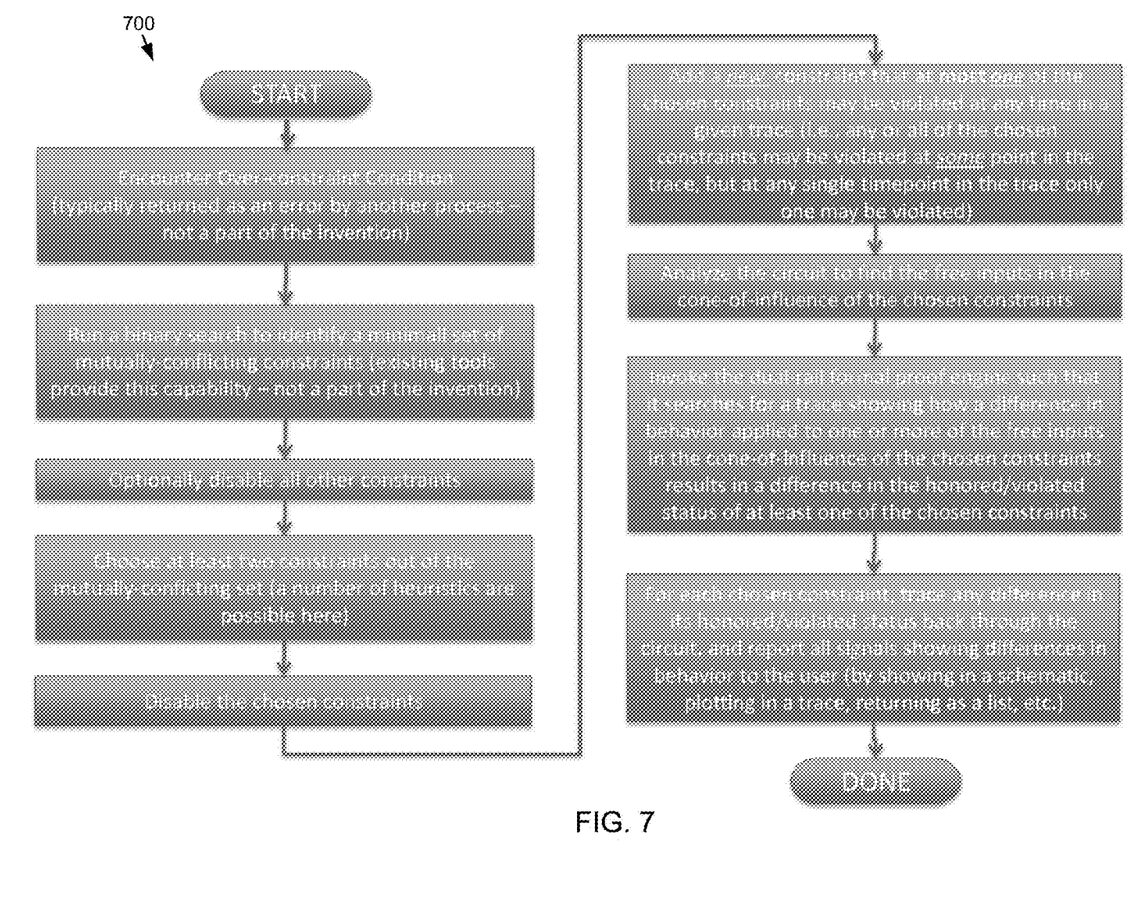
FIG. 7 is a diagram depicting an embodiment in accordance with the present disclosure.
Figure 8:
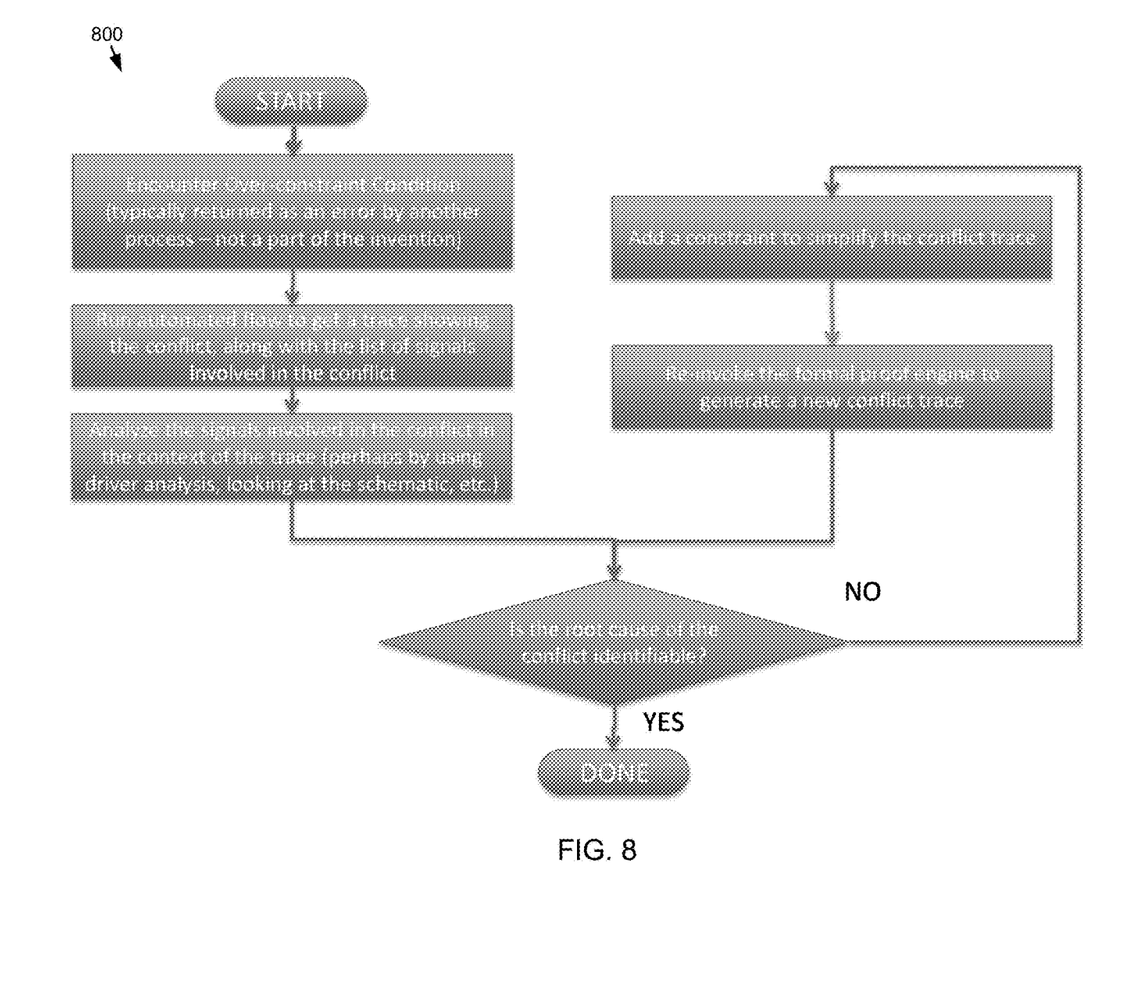
FIG. 8 is a diagram depicting an embodiment in accordance with the present disclosure.
Figure 9:
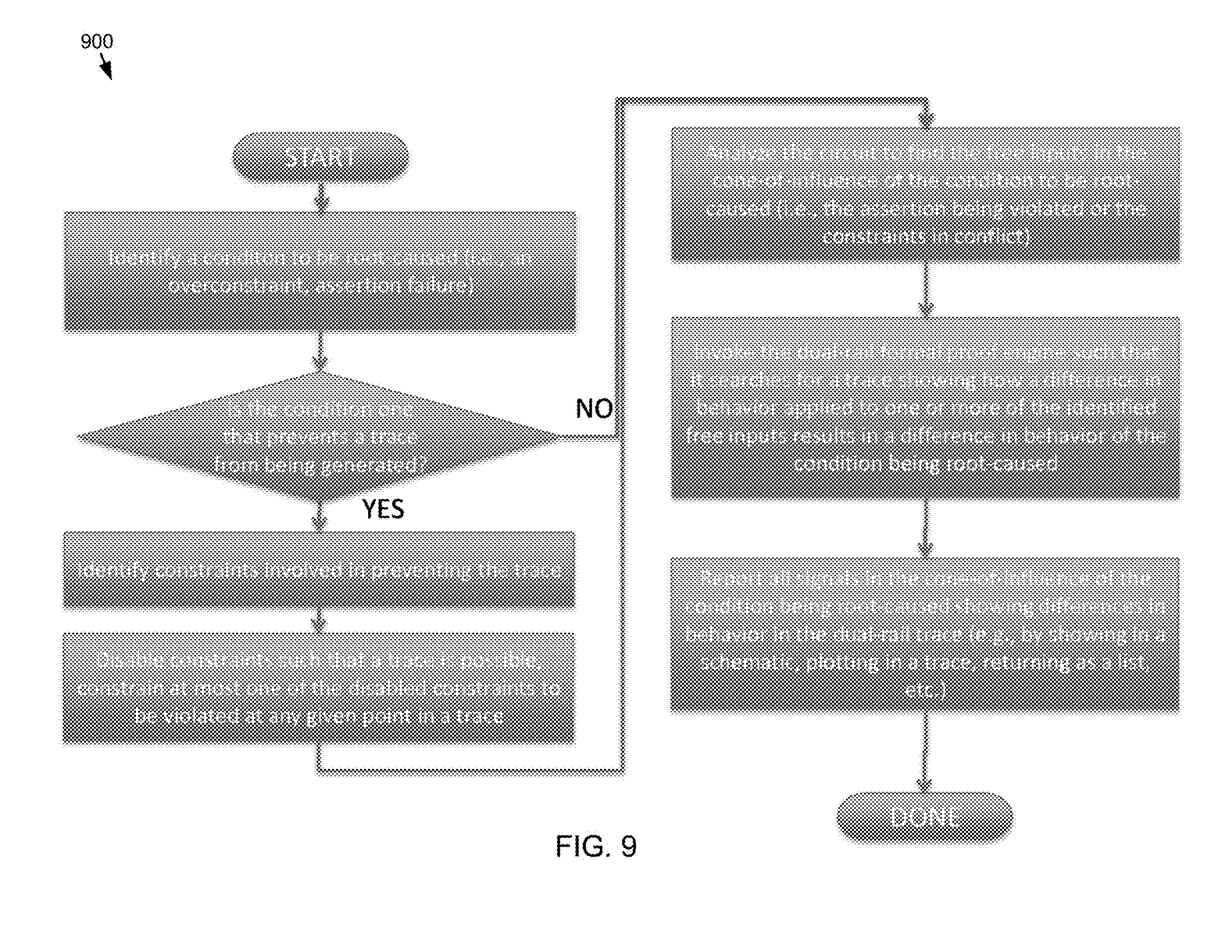
FIG. 9 is a diagram depicting an embodiment in accordance with the present disclosure.
Figure 10:
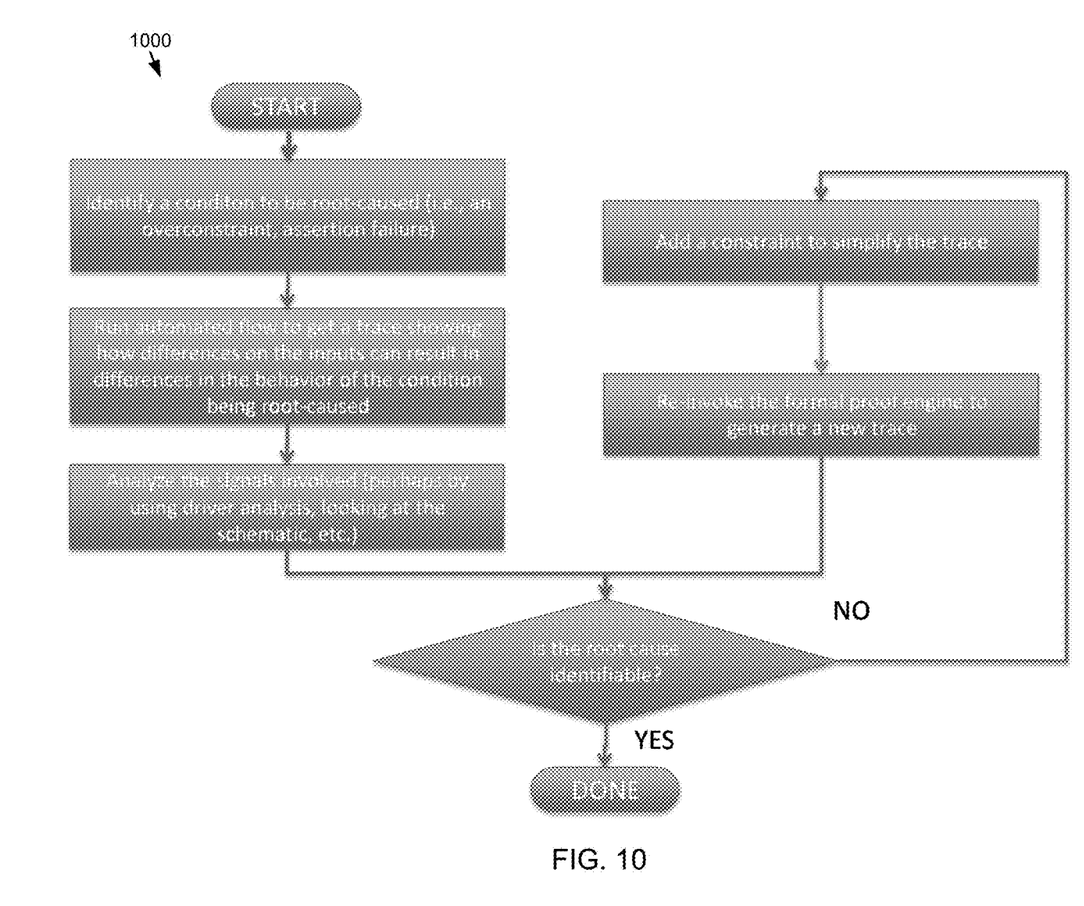
FIG. 10 is a diagram depicting an embodiment in accordance with the present disclosure.

Referring also to FIGS. 7-10, a number of flowcharts depicting operations consistent with one or more embodiments of verification process 10 are provided. FIG. 7 depicts an example automated overconstraint analysis flow. FIG. 8 depicts an example overconstraint analysis user interaction. FIG. 9 depicts an example general differential root-cause analysis automated flow. FIG. 10 depicts a general root-cause analysis user interaction. These flowcharts are provided merely by way of example as numerous additional and alternative operations are also within the scope of the present disclosure.

Accordingly, embodiments of verification process 10 may address the problem by leveraging differential analysis (e.g., using an EDA application that may include a dual-rail analysis tool for tracing the effects of differences on inputs to a circuit as they propagate through the circuit) to enable the generation and comparison of two formal traces: one honoring a given assumption and one violating it. The differences between the two traces in the fanin of the conflicting constraints represents the propagation path of the constraint through the design, and provides the information necessary to locate the root cause of the constraint conflict.

In some embodiments, an interactive constraint mechanism (e.g., an EDA application that may include an interactive means of extracting values from a trace, converting those values into new constraints, and re-invoking the formal proof engines to generate a new trace (or show that no new trace is possible)) may be leveraged to give the user control over the differential analysis. This is useful in the event that there are more than one potential conflict propagation path, in that it provides a means for the user to focus on the conflict propagation path of interest. This has the desired effect of reducing work for the tool and presenting and easier to interpret interface to the user.

Embodiments of verification process 10 may be configured to identify the assumptions that are mutually in conflict and iteratively disable groups of the conflicting assumptions. Embodiments may include formally generating trace pairs showing scenarios where one assumption in the disabled set holds on one or more cycles in one trace, and is violated on the same cycle or cycles in the other trace, with all else being mostly equal in both traces otherwise. Embodiments may further include using formal causality analysis (e.g., using an EDA application that may include a means of back-tracing a given behavior in a waveform to identify the preceding behavior(s) that caused the given behavior being analyzed to occur) to identify the signals in each trace that are relevant to the assertion holding/being violated (e.g., changing their values on the cycles in question would change the violated/holds status of the constraint in question). Embodiments may also include comparing the obtained relevant signal/cycle/value information between the two traces to identify relevant signals that have different values on their relevant cycles in the 'holds' trace as compared to the 'violated' case. The outcome of the above may be referred to as the "propagation path" of the conflict.

In some embodiments, the propagation path may be communicated to the user using any suitable approach. For example, by returning it as a list of signal/cycle pairs, plotting the signals in a trace viewer (e.g., ordered to show the propagation of the conflict over time), and/or displaying the signals along with the logic that connects them in a schematic viewer. If the path shown, by one of the means listed above, is not of interest to the user, the interactive constraint mechanism, as discussed above, may provide a means for the user to specify what about the current path is not of interest, and obtain a new conflict (if one exists) that propagates along a different path.

Embodiments of verification process 10 may be configured to precisely identify the signals involved in the constraint conflict, and show how the conflict propagates over time and through the circuit. In addition, embodiments of the present disclosure may provide for user control over the results of the analysis, providing a means of focusing in on the root of the problem. The conventional implementation only identifies the constraints that are in mutual conflict, but does nothing to show the mechanism of the conflict. The advantage of my invention is that it provides far more precise and actionable information to the user than existing solutions, thereby greatly reducing the time, effort, and frustration involved in resolving constraint conflicts.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design verification comprising:
    receiving, using at least one processor, an electronic design;
    identifying one or more assumptions associated with the electronic design that are mutually in conflict;
    grouping the one or more assumptions that are mutually in conflict into a conflicting group of assumptions;
    iteratively disabling at least one of the conflicting group of assumptions;
    generating, at a graphical user interface, at least one trace pair depicting a scenario where an assumption from a disabled set holds in a first trace but is violated in a second trace;
    identifying at least one signal associated with the first trace and at least one signal associated with the second trace; and
    comparing the at least one signal associated with the first trace and the at least one signal associated with the second trace.

2. The computer-implemented method of claim 1, wherein comparing includes identifying a difference in value between the first trace and the second trace.

3. The computer-implemented method of claim 2, further comprising:
    providing the difference in value between the first trace and the second trace to a user's computing device.

4. The computer-implemented method of claim 3, wherein providing includes providing at least one signal pair or at least one cycle pair.

5. The computer-implemented method of claim 4, further comprising:
displaying the at least one signal pair or at least one cycle pair within a trace viewer.

6. The computer-implemented method of claim 5, further comprising:
displaying logic associated with the at least one signal pair or at least one cycle pair in a schematic viewer.

7. The computer-implemented method of claim 6, further comprising:
receiving an indication from a user regarding a section of a current path that is not of interest; and
obtaining a new conflict associated with a new path.

8. A computer-readable storage medium for electronic design verification, the computer-readable storage medium having stored thereon instructions that when executed by a machine result in one or more operations, the operations comprising:
receiving, using at least one processor, an electronic design;
identifying one or more assumptions associated with the electronic design that are mutually in conflict;
grouping the one or more assumptions that are mutually in conflict into a conflicting group of assumptions;
iteratively disabling at least one of the conflicting group of assumptions;
generating, at a graphical user interface, at least one trace pair depicting a scenario where an assumption from a disabled set holds in a first trace but is violated in a second trace;
identifying at least one signal associated with the first trace and at least one signal associated with the second trace; and
comparing the at least one signal associated with the first trace and the at least one signal associated with the second trace.

9. The computer-readable storage medium of claim 8, wherein comparing includes identifying a difference in value between the first trace and the second trace.

10. The computer-readable storage medium of claim 9, wherein operations further comprise:
providing the difference in value between the first trace and the second trace to a user's computing device.

11. The computer-readable storage medium of claim 10, wherein providing includes providing at least one signal pair or at least one cycle pair.

12. The computer-readable storage medium of claim 11, wherein operations further comprise:
displaying the at least one signal pair or at least one cycle pair within a trace viewer.

13. The computer-readable storage medium of claim 12, wherein operations further comprise:
displaying logic associated with the at least one signal pair or at least one cycle pair in a schematic viewer.

14. The computer-readable storage medium of claim 13, wherein operations further comprise:
receiving an indication from a user regarding a section of a current path that is not of interest; and
obtaining a new conflict associated with a new path.

15. A system for electronic design verification comprising:
a computing device having at least one processor configured to receive an electronic design and identify one or more assumptions associated with the electronic design that are mutually in conflict, the at least one processor further configured to group the one or more assumptions that are mutually in conflict into a conflicting group of assumptions and iteratively disable at least one of the conflicting group of assumptions, the at least one processor further configured to generate, at a graphical user interface, at least one trace pair depicting a scenario where an assumption from a disabled set holds in a first trace but is violated in a second trace, the at least one processor further configured to identify at least one signal associated with the first trace and at least one signal associated with the second trace and compare the at least one signal associated with the first trace and the at least one signal associated with the second trace.

16. The system of claim 15, wherein comparing includes identifying a difference in value between the first trace and the second trace.

17. The system of claim 16, wherein the at least one processor is further configured to provide the difference in value between the first trace and the second trace to a user's computing device.

18. The system of claim 17, wherein providing includes providing at least one signal pair or at least one cycle pair.

19. The system of claim 18, wherein the at least one processor is further configured to display the at least one signal pair or at least one cycle pair within a trace viewer.

20. The system of claim 19, wherein the at least one processor is further configured to display logic associated with the at least one signal pair or at least one cycle pair in a schematic viewer.

* * * * *